United States Patent [19]

Irie

[11] Patent Number: 4,837,063
[45] Date of Patent: Jun. 6, 1989

[54] OPTICAL RECORDING MATERIAL

[75] Inventor: Masahiro Irie, Sakai, Japan

[73] Assignee: Mitsubishi Chemical Industries Limited, Tokyo, Japan

[21] Appl. No.: 167,117

[22] Filed: Mar. 11, 1988

[51] Int. Cl.$^4$ ............................................. B32B 3/00
[52] U.S. Cl. ..................................... 428/64; 428/65; 428/76; 428/441; 428/480; 428/515; 428/522; 428/523; 428/524; 428/413; 428/532; 428/333; 428/334; 428/335; 428/336; 428/908; 428/913; 430/945; 369/288; 346/76 L; 346/135.1
[58] Field of Search .......................... 346/76 L, 135.1; 428/64, 65, 913, 908, 441, 515, 412, 461, 333-336, 522.4, 413, 532; 369/288; 430/945

[56] References Cited

U.S. PATENT DOCUMENTS 4,046,577  9/1977  Muzyczko et al. ................. 430/285
4,615,967 10/1986  Tenhover et al. .................. 430/495

OTHER PUBLICATIONS

Optical Engineering, vol. 15, No. 2, Mar./Apr. 76, SPIE, Review & Analysis of Optical Recording Media, Bartolini et al., pp. 99-108.

Primary Examiner—Ellis P. Robinson
Attorney, Agent, or Firm—Oblon, Spivak, McClelland, Maier & Neustadt

[57] ABSTRACT

An optical recording material comprising a recording layer containing a substance with its optical properties changeable by irradiation with light in which information is recorded by irradiating the recording layer with light, said substance being an ethylene derivative having at its 1- and 2-positions heterocyclic groups which are cyclizable by irradiation with light to form a cyclohexadiene ring and thereby change the optical properties, and the other 1- and 2-positions connected to each other to form a ring.

20 Claims, 3 Drawing Sheets

OPTICAL RECORDING MATERIAL

BACKGROUND OF THE INVENTION

1. Field of the Invention

The present invention relates to an optical recording material using an ethylene derivative having at its 1- and 2-positions heterocyclic groups which are cyclizable by irradiation with light to form a cyclohexadiene ring and thereby to change the optical properties and other 1- and 2-positions connected to each other to form a ring. More particularly, the present invention relates to an optical recording material using a photochromic compound, which is useful as various recording or memory materials, photocopying materials, light controlling materials, photosensitive printing materials, laser beam sensitive materials, photoprinting or optical filters, masking materials, actinometers or display materials.

2. Discussion of the Background

Various compounds have been known which have photochromic properties (photon mode color changes) and which undergo coloring or discoloring when irradiated with light. Photochromic materials utilizing such properties have been proposed.

For instance, Japanese Unexamined Patent Publication No. 149812/1980 discloses a photochromic material having a spiropyrane compound of the following formula dispersed in a nitrocellulose resin:

wherein $R^a$ is a hydrogen atom or a halogen atom, $R^b$ is an alkyl group, and $R^c$ is a hydrogen atom or an alkoxy group.

Further, Japanese Unexamined Patent Publication No. 28824/1975 discloses a photochromic photosensitive material having a spiropyrane compound of the following formula dispersed in a polymer compound having an alcoholic hydroxyl group:

wherein each of $R^d$ and $R^e$ is a hydrogen atom, a halogen atom, an alkyl group or an alkoxy group.

Furthermore, Japanese Examined Patent Publication No. 28892/1970 discloses a photochromic material containing a spironaphthooxazine compound of the formula:

wherein $R^f$ is a hydrogen atom, a halogen atom, a cyano group or an alkyl or alkoxy group having from 1 to 8 carbon atoms.

Meantime, there has been active research in recent years concerning employment of such photochromic compounds as reversible optical recording materials. For this purpose, the following conditions are required to be satisfied.

(1) Sensitivity to a semiconductor laser beam
(2) Non-destructive reading out property
(3) Thermal stability of recorded information
(4) Quick response
(5) Durability against repeated operation When a photochromic compound is used as an optical recording material, a particularly serious problem is that the thermal stability of recorded information under item (3) among the above requirements is not adequate and the recorded information written in by the photochemical reaction is unstable. Namely, in the case of conventional photochromic compounds, the colored state is usually thermally unstable and tends to return to the initial state in a few hours at room temperature. Thus, they have a drawback that the thermal stability of recorded information is inferior.

On the other hand, those having good thermal stability have a problem that they are usually inferior in durability under repeated operation. Therefore, the conventional photochromic compounds can hardly be regarded as having fully satisfactory properties as optical recording materials.

SUMMARY OF THE INVENTION

It is an object of the present invention to provide an optical recording material wherein an excellent photochromic compound free from such conventional problems, is employed.

The present invention provides an optical recording material comprising a recording layer containing a substance with its optical properties changeable by irradiation with light in which information is recorded by irradiating the recording layer with light, said substance being an ethylene derivative having at its 1- and 2-positions heterocyclic groups which are cyclizable by irradiation with light to form a cyclohexadiene ring and thereby change the optical properties, and the other 1- and 2-positions connected to each other to form a ring.

DETAILED DESCRIPTION OF THE PREFERRED EMBODIMENTS

Now, the optical recording material of the present invention will be described in detail.

The ethylene derivative to be incorporated in the recording layer of the optical recording material of the present invention has the photochromic property of reversibly undergoing a color change by irradiation with light. This ethylene derivative has at the 1- and 2-positions of the ethylene bond heterocyclic groups which are cyclizable by irradiation with light to form a cyclohexadiene ring, and the other 1- and 2-positions are connected to each other to form a ring.

The heterocyclic group at the 1- and 2-positions of the ethylene derivative cyclizable by irradiation with light to form a cyclohexadiene ring thereby to change the optical properties, may be, for example, a group represented by the formula I or II:

(I)

wherein $R^1$ is an alkyl group, a halogen atom or a trifluoromethyl group, each of $R^2$ and $R^3$ is a hydrogen atom, an alkyl group, a halogen atom, a trifluoromethyl group or a substituted or unsubstituted phenyl group, and $R^4$ is a hydrogen atom or a substituted or unsubstituted alkyl, aryl or cycloalkyl group, (II)

wherein ring A is a hydrocarbon ring or a hetero ring, and $R^5$ is an alkyl group, a halogen atom or a trifluoromethyl group, wherein $R^6$ is a hydrogen atom or a substituted or unsubstituted alkyl, aryl or cycloalkyl group.

Specific examples of the heterocyclic groups of the formulas I and II include the following, in which $R^1$ to $R^5$ are as defined above with respect to the formula I and II.

The ethylene derivative of the present invention having such heterocyclic groups at the 1- and 2-positions and the other 1- and 2-positions connected to each other to form a ring, may be, for example, a compound represented by the formula III or IV:

(III)

wherein ring B is a hydrocarbon ring or a hetero ring, each of each of $R^1$ and $R^{11}$ is an alkyl group, a halogen atom or a trifluoromethyl group, each of $R^2$, $R^{12}$ and $R^3$ is a hydrogen atom, an alkyl group, a halogen atom, a trifluoromethyl group or a substituted or unsubstituted phenyl group, and $R^4$ is a hydrogen atom or a substituted or unsubstituted alkyl, aryl or cycloalkyl group, wherein X and X' may be the same or different, and Y and Y' may be the same or different, (IV)

wherein each of rings A, A' and B is a hydrocarbon ring or a hetero ring, each of and each of $R^5$ and $R^{5'}$ is an alkyl group, a halogen atom or a trifluoromethyl group, wherein $R^6$ is a hydrogen atom or a substituted or unsubstituted alkyl, aryl or cycloalkyl group, A and A' may be the same or different, and Z and Z' may be the same or different.

In the above formulas I, II, III and IV, the alkyl group for $R^1$, $R^{11}$, $R^5$ and $R^{5'}$ is preferably an alkyl group having from 1 to 4 carbon atoms, more preferably a methyl group or an ethyl group. The alkyl group for $R^2$, $R^3$ and $R^{12}$ may be a straight chain or branched alkyl group having from 1 to 20 carbon atoms such as a methyl group, an ethyl group, a n-propyl group, an i-propyl group, a n-butyl group, an i-butyl group, a sec-butyl group, a n-pentyl group, a n-heptyl group, a n-hexyl group, a n-octyl group, a 2-ethylhexyl group or a n-stearyl group, preferably an alkyl group having from 1 to 4 carbon atoms.

The halogen atom for $R^1$, $R^2$, $R^3$, $R^5$, $R^{5'}$, $R^{11}$ and $R^{12}$ includes a fluorine atom, a chlorine atom, a bromine atom and an iodine atom.

The substituent on the phenyl group for $R^2$, $R^3$ and $R^{12}$ may be an alkyl group, an alkoxy group, or a halogen atom. Here, the alkyl group is preferably a lower alkyl group having from 1 to 4 carbon atoms, the alkoxy group is preferably a lower alkoxy group having from 1 to 4 carbon atoms, and the halogen atom includes a fluorine atom, a chlorine atom, a bromine atom and an iodine atom.

For $R^4$ and $R^6$, the alkyl group is preferably an alkyl group having from 1 to 6 carbon atoms, the aryl group is preferably a phenyl group, and the cycloalkyl group is preferably a cyclohexyl group or a cyclopentyl group. The substituent for such groups includes an alkoxy group, an alkoxyalkoxy group, an alkoxyalkoxyalkoxy group, an allyloxy group, an aryl group, an aryloxy group, a cyano group, a hydroxyl group and a tetrahydrofuryl group.

In the above formulas I and III, a preferred hetero ring is a ring wherein when each of X, X' is each of Y and Y' is each of $R^1$ and $R^{11}$ is an alkyl group having from 1 to 4 carbon atoms, and each of $R^2$, $R^3$ and $R^{12}$ is an alkyl group having from 1 to 20 carbon atoms. Particularly preferred is a group wherein each of Y and Y' is and each of $R^1$, $R^2$, $R^3$, $R^{11}$ and $R^{12}$ is an alkyl group having from 1 to 4 carbon atoms. On the other hand when each of X and X' is it is preferred that each of Y and Y' is and each of $R^1$, $R^2$, $R^{11}$ and $R^{12}$ is an alkyl group having from 1 to 4 carbon atoms or a phenyl group which is unsubstituted or substituted by a lower alkyl group, a lower alkoxy group or a halogen atom.

In the formulas II and IV, a preferred heterocyclic group is a group wherein each of Z and Z' is each of rings A and A' is a benzene ring, a naphthalene ring, a pyridine ring or quinoline ring, and each of $R^5$ and $R^{5'}$ is an alkyl group having from 1 to 4 carbon atoms. Particularly preferred is a heterocyclic group wherein each of Z and Z' is each of $R^5$ and $R^{5'}$ is an alkyl group having 1 or 2 carbon atoms and each of rings A and A' is a benzene ring.

The hydrocarbon ring or the hetero ring for ring B in the formula III or IV, may be a benzene ring, a naphthalene ring, a quinoline ring or a ring of the formula:

wherein $X^3$ is wherein $R^{16}$ is a hydrogen atom or an alkyl group which is unsubstituted or substituted by an alkoxy group or a phenyl group, and Q is O, S or NH, or when $X^3$ is

$$\diagdown_{/}NR^{16},$$

$X^3$ and Q are connected to form a benzoimidazole ring.

The alkyl group for $R^{16}$ is preferably an alkyl group having from 1 to 4 carbon atoms, and the alkoxy group is the substituent is preferably an alkoxy group having from 1 to 4 atoms.

Specific examples of the ethylene derivative of the present invention will be given in Tables 1 and 2.

TABLE 1

| No | X | Y | $R^1$ | $R^2$ | X' | Y' | $R^{11}$ | $R^{12}$ |  |
|---|---|---|---|---|---|---|---|---|---|
| 1 | CH₃C | S | CH₃ | CH₃ | CH₃C | S | CH₃ | CH₃ | |
| 2 | " | N\|CH₃ | " | " | " | N\|CH₃ | " | " | " |
| 3 | " | O | " | " | " | O | " | " | " |
| 4 | N | O | " | " | N | O | " | " | " |
| 5 | CH₃C | S | " | " | CH₃C | N\|CH₃ | " | " | " |
| 6 | N | S | " | " | N | S | " | " | " |
| 7 | CH₃C | Se | " | " | CH₃C | Se | " | " | " |

TABLE 1-continued $$\underset{R^2}{\overset{X}{\diagdown}} Y \underset{R^1}{\overset{B}{\diagup}} \underset{R^{11}}{\overset{1\ 2}{\diagdown}} Y' \underset{}{\overset{X'}{\diagdown}} R^{12}$$

| No | X | Y | R¹ | R² | X' | Y' | R¹¹ | R¹² | B (1 2) |
|---|---|---|---|---|---|---|---|---|---|
| 8 | CH₃C | S=O | CH₃ | CH₃ | CH₃C | S=O | CH₃ | CH₃ | maleic anhydride (O=C-O-C=O on C=C) |
| 9 | " | S(=O)(=O) (SO₂) | " | " | " | S(=O)(=O) | " | " | " |
| 10 | C₂H₅C | S | C₂H₅ | C₂H₅ | C₂H₅C | S | C₂H₅ | C₂H₅ | " |
| 11 | " | S | CH₃ | " | " | S | CH₃ | " | " |
| 12 | (n)C₃H₇C | " | " | (n)C₃H₇ | (n)C₃H₇C | " | " | (n)C₃H₇ | " |
| 13 | CH₃C | " | C₂H₅ | CH₃ | CH₃C | " | C₂H₅ | CH₃ | " |
| 14 | " | " | C₄H₉(n) | " | " | " | (n)C₄H₉ | " | " |
| 15 | " | " | CH₃ | C₁₈H₃₇(n) | " | " | CH₃ | C₁₈H₃₇(n) | " |
| 16 | CH₃C | S | C₂H₅ | CH₃ | CH₃C | S | CH₃ | CH₃ | maleic anhydride |
| 17 | " | " | Cl | " | " | " | Cl | " | " |
| 18 | BrC | " | CF₃ | " | BrC | " | CF₃ | " | " |
| 19 | CH₃C | " | " | CF₃ | CH₃C | " | " | CF₃ | maleic anhydride (1,2) |
| 20 | " | " | I | CH₃ | " | " | I | CH₃ | " |
| 21 | " | " | CH₃ | " | " | " | CH₃ | " | N-methyl maleimide |
| 22 | CH₃C | S | CH₃ | CH₃ | CH₃C | S | CH₃ | CH₃ | N-H maleimide |
| 23 | " | " | " | " | " | " | " | " | N-(C₂H₄OCH₃) maleimide |
| 24 | " | " | " | " | " | " | " | " | N-benzyl maleimide |

TABLE 1-continued

| No | X | Y | R¹ | R² | X' | Y' | R¹¹ | R¹² | B |
|----|-----|-----|-----|-----|-----|-----|-----|-----|---|
| 25 | " | " | " | " | " | " | " | " |  |
| 26 | CH₃C | S | CH₃ | CH₃ | CH₃C | S | CH₃ | CH₃ |  |
| 27 | " | " | " | " | " | " | " | " |  |
| 28 | " | " | " | " | " | " | " | " |  |
| 29 | " | " | " | " | " | " | " | " |  |
| 30 | CH₃C | S | CH₃ | CH₃ | CH₃C | S | CH₃ | CH₃ |  |
| 31 | " | " | " | " | " | " | " | " |  |
| 32 | " | " | " | " | " | " | " | " |  |
| 33 | N | S | " |  | N | " | CH₃ |  |  |

TABLE 1-continued

| No | X | Y | R¹ | R² | X' | Y' | R¹¹ | R¹² | B |
|----|---|---|----|----|----|----|-----|-----|---|
| 34 | CH₃C | " | " | " | CH₃C | " | " | " | " |
| 35 | N | S | CH₃ | -C₆H₄-CH₃ (p-tolyl) | N | S | CH₃ | -C₆H₄-CH₃ (p-tolyl) | maleic anhydride ring |
| 36 | " | " | " | phenyl | " | " | " | phenyl | N-methylmaleimide ring |
| 37 | " | " | " | " | " | " | " | " | N-phenylmaleimide ring |

TABLE 2

| No | Z | R⁵ | A | Z' | R⁵' | A' | B |
|----|---|----|----|----|-----|----|---|
| 1 | S | CH₃ | phenyl | S | CH₃ | phenyl | maleic anhydride ring |
| 2 | O | " | " | O | " | " | " |
| 3 | Se | " | " | Se | " | " | " |
| 4 | S(→O)(→O) | " | " | S(→O)(→O) | " | " | " |
| 5 | S=O | " | " | S=O | " | " | " |
| 6 | N-CH₃ | " | " | N-CH₃ | " | " | " |

TABLE 2-continued

| No | Z | R⁵ | A | Z' | R⁵' | A' | B 1-2 |
|----|---|----|----|---|----|----|----|
| 7  | S | "  | (1,2-naphthyl) | S | "  | (1,2-naphthyl) | " |
| 8  | " | "  | (2,3-naphthyl) | " | "  | (2,3-naphthyl) | " |
| 9  | " | "  | (2,3-pyridyl)  | " | "  | (2,3-pyridyl)  | " |
| 10 | " | "  | (quinolinyl)   | " | "  | (quinolinyl)   | " |

In the present invention, particularly preferred as the ethylene derivative is a dithienyl maleic anhydride derivative of the formula V or VI:

(V)

wherein each of $R^8$, $R^9$, $R^{14}$ and $R^{15}$ is an alkyl group having from 1 to 4 carbom atoms, and each of $R^7$ and $R^{13}$ is an alkyl group having 1 or 2 carbon atoms, (VI)

wherein each of $R^8$ and $R^{14}$ is an alkyl group having from 1 to 4 carbon atoms or a phenyl group, and each of $R^7$ and $R^{13}$ is an alkyl group having 1 or 2 carbon atoms.

The ethylene derivative of the present invention such as the dithienyl maleic anhydride derivative of the formula V can readily be prepared by the following scheme:

Namely, the cyanomethylthiophene derivatives of the formula A and B are firstly condensed in a water-/organic solvent in the presence of an interphase transfer catalyst under an alkaline condition to form a dithienyldicyanoethene derivative of the formula C.

In this case, as the organic solvent to be used for the condensation reaction, a halogenated solvent such as dichloromethane, chloroform, carbon tetrachloride or tetrachloroethane is preferred. As the interphase transfer catalyst, tetrabutylammonium bromide, tetrabutylammonium iodide or triethylbenzylammonium chloride may be mentioned. As the alkali agent, sodium hydroxide or potassium hydroxide may be mentioned.

The condensation reaction temperature is preferably from room temperature to 100° C., more preferably from 40° to 50° C.

Then, the dithienyldicyanoethene derivative of the formula C thus obtained is hydrolyzed and converted to an acid anhydride to obtain a maleic anhydride derivative of the formula V.

The reaction for the hydrolysis and convertion to acid anhydride can be conducted in a polar solvent such as water or methanol, ethanol, ethyleneglycol, ethyleneglycol monomethyl ether, ethyleneglycol monoethyl ether, diethyleneglycol monoethyl ether, N-methylpyrrolidone, N,N-dimethylformamide or 1,3-dimethyl-2-imidazolidinone in the presence of an alkali agent such as sodium hydroxide or potassium hydroxide at room temperature or under heating to a temperature up to the boiling point of the solvent. After the reaction, the mixture is neutralized with an acid, and the product is taken out in the form of solid and, if necessary, purified by e.g. column chromatography, recrystallization, or washing with a solvent.

When the ethylene derivative of the present invention is irradiated with light, the hetero rings W and W' are cyclized to form a cyclohexadiene ring as shown by the following formulas, the ethylene derivative thereby undergoes a structural change from the formula D to the formual E and thus undergoes a color change. The colored state can reversibly be returned to the initial state by a photo reaction.

Specifically, in the case of the dithienyl maleic anhydride derivative of the formula V, when irradiated with a light having a wavelength of from 200 to 490 nm, it undergoes a structural change as shown below to form a structure of the formula VII and thereby undergoes a color change from yellow to purple. This purple-colored state can reversibly be returned by irradiation with a light having a wavelength of from 490 to 680 nm.

Such an ethylene derivative of the present invention is thermally stable in both the ring-opened state of the formula D and the colored state of the formula E. Even when heated at a high temperature for a long period of time, it does not exhibit a thermochromic reaction (thermal coloring reaction), and the colored state is stable showing no discoloration reaction. Thus, both states can be maintained under excellent conditions. Further, the structure is fixed by the rings, and the cis-trans isomerization reaction is thereby prevented, whereby the durability against the repeated coloring-discoloring operation is good.

Accordingly, a recording layer containing such an ethylene derivative is capable of exhibiting excellent properties as a reversible optical recording material.

The optical recording material of the present invention having a recording layer containing such an ethylene derivative can readily be prepared in accordance with a conventional method.

For example, the optical recording material of the present invention can be prepared by forming a recording layer by the following methods:

(a) The ethylene derivative is dispersed or dissolved in a solvent such as carbon tetrachloride, benzene, cyclohexane, methyl ethyl ketone or tetrachloroethane, if necessary, together with a binder such as polyester resin, polystyrene, polyvinyl butyral resin, polyvinylidene chloride, polyvinyl chloride, polymethyl methacrylate, polyvinyl acetate, cellulose acetate, epoxy resin or phenol resin, and then coated on a suitable substrate, or vapor-deposited on a suitable substrate by conventional vapor deposition or co-vapor deposition with other compounds.

(b) The ethylene derivative of the present invention is dissolved in a solvent as mentioned above, and then, sealed in e.g. a glass cell.

The substrate to be used in the method (a) may be transparent or opaque to the light to be used.

As the material for the substrate, there may be mentioned glass, plastics, paper, metal sheets or foils, which are commonly employed as supports for recording materials. Among them, plastics are preferred from various standpoints. The plastics include acrylic resin, methacrylic resin, vinyl acetate resin, vinyl chloride resin, nitrocellulose, polyethylene resin, polypropylene resin, polycarbonate resin, polyimide resin and polysulfone resin.

(D)
(Ethylene derivative)

(E)
(Formation of a cyclohexadiene ring)

The recording layer formed on such a substrate preferably has a thickness of from 100 Å to 100 μm, more preferably from 1,000 Å to 10 μm.

As the film-forming method, it is possible to employ a conventional thin film-forming method such as a vacuum deposition method, a sputtering method, a doctor blade method, a casting method, a spinner method or a dipping method.

When a binder is employed for the film-forming, the ethylene derivative of the present invention is used preferably in an amount of at least 1% by weight relative to the binder.

When, the film-forming is conducted by a spinner method, the rotational speed is preferably from 500 to 5,000 rmp. After spin-coating, heat treatment or treatment with a solvent vapor may be applied as the case requires.

In the case where the recording layer is formed by a coating method such as a doctor blade method, a casting method, a spinner method or a dipping method, paticularly by a spinner method, a solvent having a boiling point of from 120° to 160° C. such as bromoform, dibromoethane, ethyl cellosolve, xylene, chlorobenzene or cyclohexanone is preferably employed as the coating element.

On the other hand, in the case of an optical recording material wherein the recording layer is formed as being sealed in a cell, the concentration of the ethylene derivative in the recording layer is preferably at least $10^{-5}$ mol/liter.

In the present invention, the recording layer may further contain a transition metal chelate compound (such as acetyl acetonate chelate, bisphenyldithiol, salicylaldehyde oxime or bisdithio-α-diketone) or a tertiary amine compound as a singlet oxygen quencher in order to improve the stability or light resistance of the recording layer.

The recording layer of the optical recording material of the present invention may be provided on both sides of the substrate, or may be provided on one side only.

Recording of information onto the optical reeording material of the present invention thus obtained, is effected by irradiating the recording layer provided on one side or each side of the substrate or the recording layer in a cell, with a light collimated to a beam diameter of from 1 to 10 μm. Thus, the irradiated portion undergoes a color change upon absorption of the light energy. Reproduction of the recorded information can be effected by reading the difference in the reflectivity factor or in the absorbance between the portion where the color change has occured by irradiation and the portion where no such color change has occured.

As the light source to be used for the optical recording material of the present invention, for example, a mercury lamp, a xenon lamp and laser beams (such as $N_2$, He-Cd, Ar, He-Ne, ruby, semiconductor or pigment laser) may be mentioned. Among them, it is most preferred to use laser beams.

The optical recording material of the present invention having a recording layer containing such a substance with its optical properties changeable by irradiation with light, particularly the optical recording material containing a photochromic compound which undergoes reversible color change by irradiation with light, is thermally stable and does not exhibit thermochromism. It undergoes a color change when irradiated with light, and the colored state is thermally extremely stable, but when irradiated with a light having a different wavelength, it returns to the initial state. It is possible to repeat this color change reversibly. Thus, information recording can be made by irradiation with light, and reproduction of the recorded information can be made by reading the difference in the reflectivity factor or the absorbance between the portion where such a color change has occured and the portion where no such color change has taken place. Yet it is possible to erase the recorded information by irradiating it with a light having a different wavelength. Thus, the optical recording material of the present invention is useful for such an erasable optical recording material.

The optical recording material of the present invention which is a reversible recording material capable of recording information by such a photon mode, adequately satisfies various requirements required for an optical recording material such as sensitivity to a semiconductor laser, non-destructive reading out property, thermal stability of the recorded information, quick response and durability against repeated operation, and thus has excellent properties.

Now, the present invention will be described in further detail with reference to Examples.

However, it should be understood that the present invention is by no means restricted by such specific Examples.

EXAMPLE 1

(1) Preparation of dithienyl maleic anhydride derivative

20 ml of a 50% sodium hydroxide aqueous solution and 0.25 g (0.001 mol) of triethylbenzylammonium chloride were stirred at 40° C. Then, to this solution, a solution mixture comprising 15.3 g (0.09 mol) of 4-cyanomethyl-2,3,5-trimethylthiophene represented by the following formula:

and 15.3 g (0.1 mol) of carbon tetrachloride, was dropwise added over a period of 30 minutes, and the mixture was stirred at 45° C. for one hour and 30 minutes. The reaction mixture was poured into 300 ml of water and throughly stirred. The mixture was extracted three times with 100 ml of ethyl ether, and then, extracted twice with 100 ml of chloroform. The organic layers were put together and dried over anhydrous magnesium sulfate. Then, the solvent was distilled off to obtain a dark red oily product.

This product was separated and purified by silica gel column chromatography and crystallized from ethyl ether/hexane to obtain 6.9 g (yield: 47%) of a yellow powder. This product had a melting point of from 162° to 164° C.

This product was identified to be 1,2-di(2,3,5-trimethylthienyl)-1,2-dicyanoethene represented by the following formula, from the results of measurement of the following physical values.

Physical values (i) p.m.r. (CDCl$_3$) $\delta$=2.54, 2.53, 2.41, 2.36, 2.17, 2.10 (Ar—CH$_3$).

(ii) MS (m/e): 326(M$^+$), 311(M$^+$—CH$_3$).

(iii) Ir (liquid paraffin): 2220 cm$^{-1}$, 1400 cm$^{-1}$, 1375 cm$^{-1}$.

Separately, 5 ml of water and 2.4 g (0.04 mol) of potassium hydroxide were stirred to dissolve potassium hydroxide. To this solution, 5 ml of ethylene glycol monoethyl ether and 2 g (0.006 mol) of 1,2-di(2,3,5-trimethylthienyl)-1,2-dicyanoethene obtained above were added, and the mixture was reacted for 30 hours under reflux and stirring. After the completion of the (iv) p.m.r. (CCl$_4$) $\delta$=2.56, 2.54, 2.34, 2.21, 2.14, 2.01 (Ar—CH$_3$).

(3) Optical recording

Figure 1:
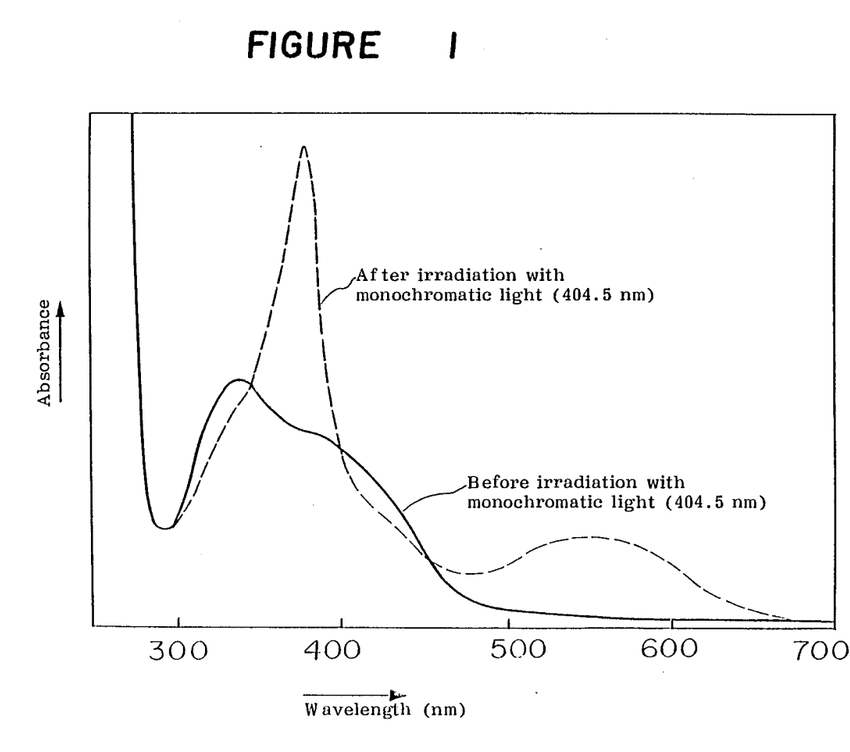
FIG. 1 is a graph showing the optical change of the absorption spectrum of the compound of the present invention in the optical recording material prepared in Example 1, wherein the abscissa indicates the wavelength (nm) and the ordinate indicates the absorbance.

The compound prepared in the above step (1) was dissolved in benzene to a concentration of 10$^{-4}$ mol/l, and a yellow solution thereby obtained was sealed in a glass cell of 1 cm×1 cm×4 cm. The sealed solution was irradiated with a monochromatic light of 404.5 nm for two minutes whereby it turned purple and its absorption spectrum changed from the one identified by the solid line in FIG. 1 to the one identified by the dotted line. Namely, by the irradiation with a light of 404.5 nm, the change shown by → in the following formulas took place, and the solution turned purple.

reaction, the mixture was cooled to room temperature and poured into 50 ml of water. Then, solid was removed by filtration, and the filtrate was adjusted to neutral or weakly acidic by dilute hydrochloric acid. Yellow solid thereby precipitated was extracted three times with 100 ml of ethyl ether and dried over anhydrous sodium sulfate. Ethyl ether was distilled off, and an oily product thus obtained was purified by silica gel column chromatography (benzene/hexane=1/1) and crystallized from ethyl ether/petroleum ether to obtain 0.41 g (yield: 20%) of a yellow powder having a melting point of 161.2° to 161.5° C.

This product was found to have the following formula from the results of measurement of the physical values as identified in item (2).

(2) Physical values (i) Infrared spectrum (liquid paraffin): 1760 cm$^{-1}$, 1825 cm$^{-1}$.

(ii) Elemental analysis (%)

|  | C | H | N | S |
| --- | --- | --- | --- | --- |
| Theoretical values | 62.40 | 5.24 | 0 | 18.51 |
| Measured values | 62.68 | 5.18 | 0 | 18.48 |

(iii) Mass spectrum: 346(M$^+$), 331(M$^+$—CH$_3$), 301(M$^+$—CO$_2$—H), 273(M$^+$—3CH$_3$—CO$_2$), 259(M$^+$—CH$_3$—C$_2$O$_3$), 125

Figure 2:
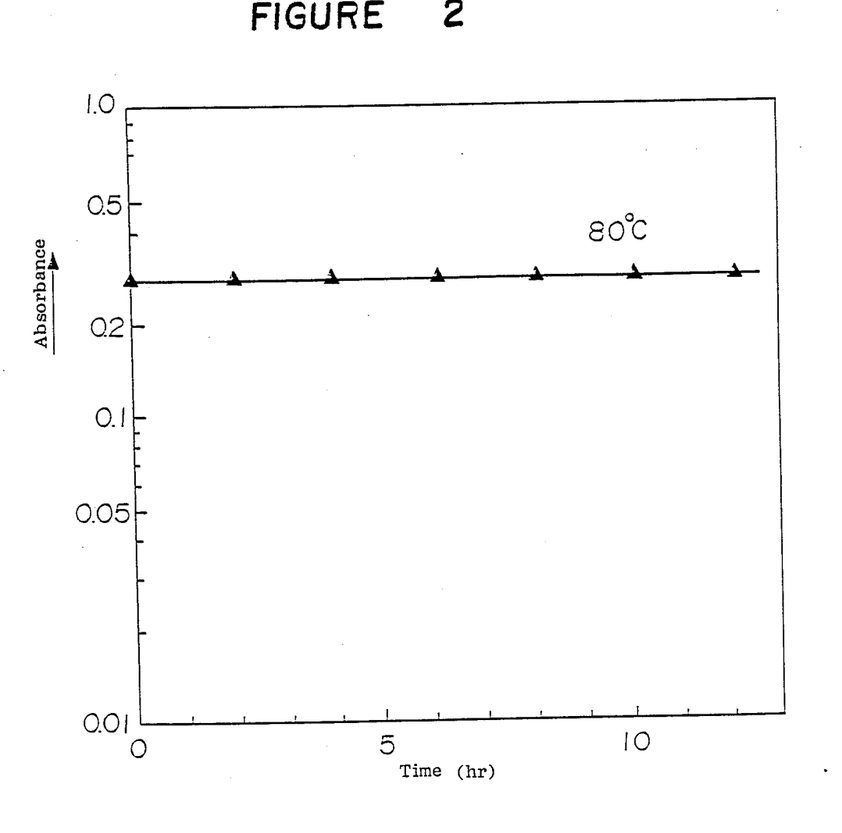
FIG. 2 is a graph showing the thermal stability of the colored state of the compound of the present invention in the optical recording material prepared in Example 1, wherein the abscissa inditates the time (hr) and the ordinate indicates the absorbance.

This colored state was thermally very stable. Even when heated at a temperature of 80° C. for more than 12 hours, the colored state did not show any reduction in the absorption, as shown in FIG. 2.

Then, the glass cell in a purple colored state was irradiated with 10 mW of He-Ne laser (633 nm) for 10 minutes, and the color immediately dissapeared and returned to the initial yellow state. This change was repeated reversibly at least 100 times.

EXAMPLE 2

1,2-di(2,3-diethyl-5-methylthienyl)-1,2-dicyanoethene having the following formula:

was prepared in the same manner as in Example 1 except that 19.2 g of a compound represented by the following formula:

was used instead of 4-cyanomethyl-2,3,5-trimethylthiophene in Example 1.

By using 2.3 g of the above product, 2,3-di(2,3-diethyl-5-methylthienyl) maleic anhydride of the following formula was obtained in the same manner as in Example 1.

In the same manner as in Example 1, a benzene solution of the compound thus obtained was sealed in a glass cell. This glass cell was irradiated with a monochromatic light of 404.5 nm for two minutes, whereby it underwent a color change from yellow to purple. The colored state was thermally very stable. Then, it was irradiated with a monochromatic light of 578.0 nm for 5 minutes by combining a mercury lamp and a filter, whereby the color immediately faded away. It was possible to repeat this color change reversibly.

EXAMPLE 3

In the same manner as in Example 1, compounds were prepared wherein $R^7$ and $R^9$ and $R^{13}$ to $R^{15}$ in the above formula V are as shown in Table 3. Benzene solutions of the respective compounds were subjected to the ultraviolet irradiation tests in the same manner as in Example 1, whereby they underwent color changes as identified in Table 3.

The respective colored states were thermally very stable. Then, such colored solutions were irradiated with visible light, whereby the colors faded away to the original yellow. It was possible to repeat this color change reversibly.

TABLE 3

| No | $R^9$ | $R^8$ | $R^7$ | $R^{13}$ | $R^{14}$ | $R^{15}$ | Before (λmax) | After (λmax) |
|---|---|---|---|---|---|---|---|---|
| 1 | C₂H₅ | C₂H₅ | C₂H₅ | C₂H₅ | C₂H₅ | C₂H₅ | yellow 335 nm | purple { 380 nm, 555 nm |
| 2 | C₃H₇ (n) | C₃H₇ (n) | CH₃ | CH₃ | C₃H₇ (n) | C₃H₇ (n) | yellow 335 nm | purple { 380 nm, 555 nm |
| 3 | C₄H₉ (n) | CH₃ | CH₃ | CH₃ | CH₃ | C₄H₉ (n) | yellow 335 nm | purple { 380 nm, 555 nm |
| 4 | CH₃ | CH₃ | C₂H₅ | C₂H₅ | CH₃ | CH₃ | yellow 335 nm | purple { 380 nm, 555 nm |
| 5 | CH₃ | CH₃ | C₄H₉ (n) | C₄H₉ (n) | CH₃ | CH₃ | yellow 335 nm | purple { 380 nm, 555 nm |
| 6 | CH₃ | C₁₈H₃₇ (n) | CH₃ | CH₃ | C₁₈H₃₇ (n) | CH₃ | yellow 335 nm | purple { 380 nm, 555 nm |
| 7 | CH₃ | CH₃ | C₂H₅ | CH₃ | CH₃ | CH₃ | yellow 335 nm | purple { 380 nm, 555 nm |

EXAMPLE 4

200 mg of the compound prepared in Example 1(1) and 20 g of polystyrene (molecular weight: 160,000) were dissolved in 400 ml of toluene, and the solution was coated on a glass substrate, followed by drying to obtain a recording layer.

Figure 3:
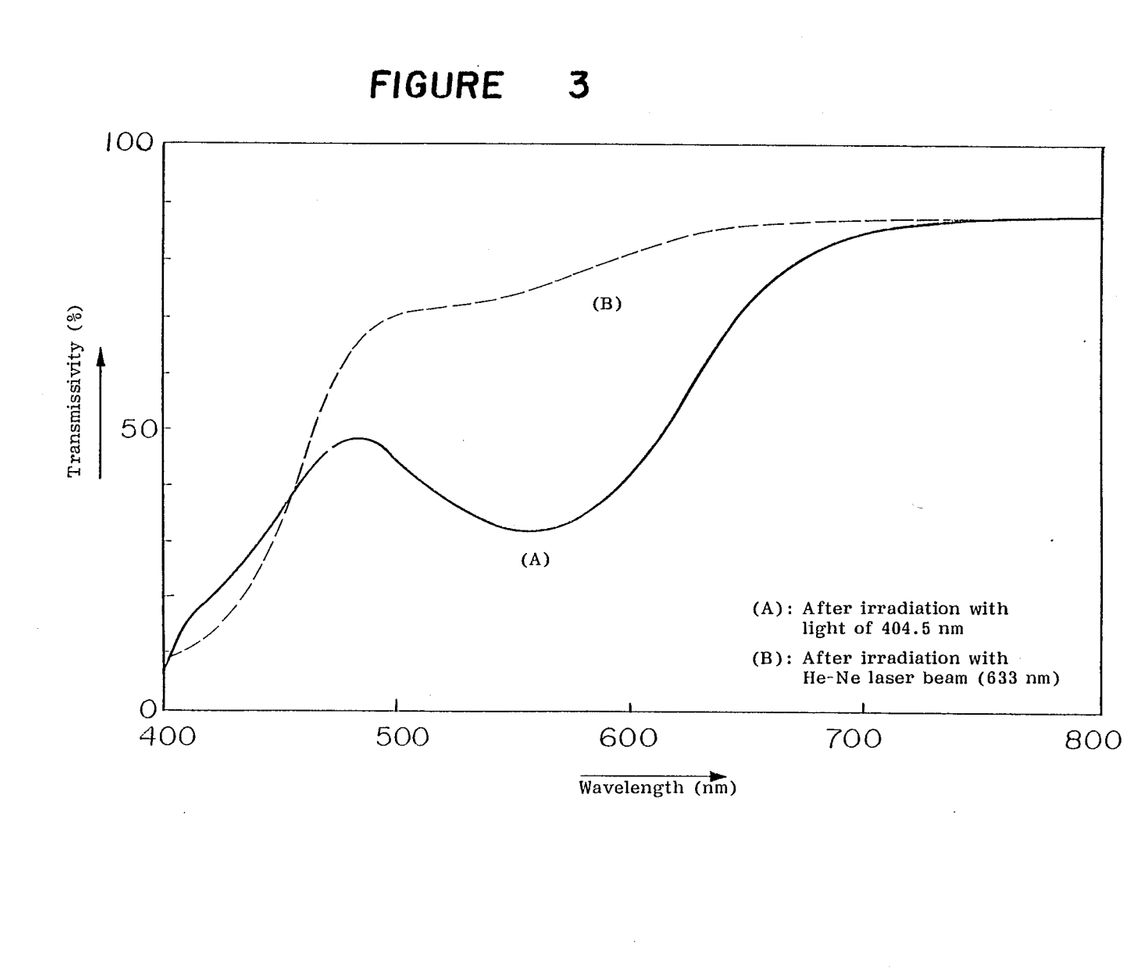
FIG. 3 is a graph showing the change in the transmissivity against the wavelength of the compound of the present invention in the optical recording material prepared in Example 4, wherein the abscissa indicates the wavelength (nm) and the ordinate indicates the transmissivity (%).

This recording layer was irradiated with a monochromatic light of 404.5 nm for 3 minutes to convert the entire surface to the colored state. The transmissivity in the colored state thus obtained is shown in FIG. 3(A). This colored state was thermally very stable, and no color fading was observed at 80° C. for more than 12 hours. Then, writing with a He-Ne laser (633 nm) of 10 mW was tested, whereby the color immediately faded away by the irradiation for 10 sections. The transmittance after the irradiation with the He-Ne laser is shown in FIG. 3(B). As shown in FIG. 3, the transmissivity at 633 nm increased from 60% to 85%.

It was possible to repeat more than 50 times this cycle of coloring and discoloring.

EXAMPLE 5

(1) Synthesis 1,2-di(2-ethyl-5-methylthiazolyl)-1,2-dicyanoethene having the following formula:

was prepared in the same manner as in Example 1 except that a compound represented by the following formula:

was used instead of 4-cyanomethyl-2,3,5-trimethylthiophene in Example 1.

By using the above product, 2,3-di(2-ethyl-5-methylthiazolyl) maleic anhydride of the following formula was obtained in the same manner as in Example 1.

(2) Optical recording 1

In the same manner as in Example 1, a benzene solution of the compound thus obtained was sealed in a glass cell. This glass cell was irradiated with a monochromatic light of 404.5 nm for two minutes, whereby it underwent a color change from yellow to bluish purple. The colored state was thermally very stable. Then, it was irradiated with a monochromatic light of 600 nm for 5 minutes by combining a mercury lamp and a filter, whereby the color immediately faded away. It was possible to repeat this color change reversibly.

(3) Optical recording 2

200 mg of the compound prepared in Example 5(1) and 20 g of polystyrene (molecular weight: 160,000) were dissolved in 400 ml of toluene, and the solution was coated on a glass substrate, followed by drying to obtain a recording layer.

This recording layer was irradiated with a monochromatic light of 404.5 nm for 3 minutes to convert the entire surface to the colored state. This colored state was thermally very stable, and no-color fading was observed at 80° C. for more than 12 hours. Then, writing with a He-Ne laser (633 nm) of 10 mW was tested, whereby the color immediately faded away by the irradiation for 10 seconds.

It was possible to repeat more than 50 times this cycle of coloring and discoloring.

What is claimed is:

1. An optical recording material comprising a recording layer containing a substance with its optical properties changeable by irradiation with light in which information is recorded by irradiating the recording layer with light, said substance being an ethylene derivative which is ethylene having at each of its 1- and 2-positions a heterocyclic group which heterocyclic groups at the 1- and 2-positions are cyclizable by irradiation with light to form a cyclohexadiene ring and thereby change the optical properties, and wherein the other 1- and 2-positions are connected to each other to form a hydrocarbon ring of a heterocyclic ring.

2. The optical recording material according to claim 1, wherein the heterocyclic groups at the 1- and 2-positions of the ethylene derivative are represented by the formula I or II:

wherein $R^1$ is an alkyl group, a halogen atom or a trifluoromethyl group, each of $R^2$ and $R^3$ is a hydrogen atom, an alkyl group, a halogen atom, a trifluoromethyl group or a substituted or unsubstituted phenyl group, and $R^4$ is a hydrogen atom or a substituted or unsubstituted alkyl, aryl or cycloalkyl group, wherein ring A is a hydrocarbon ring or a hetero ring, and $R^5$ is an alkyl group, a halogen atom or a trifluoromethyl group, wherein $R^6$ is a hydrogen atom or a substituted or unsubstituted alkyl, aryl or cycloalkyl group.

3. The optical recording material according to claim 1, wherein the ethylene derivative is represented by the formula III or IV:

wherein ring B is a hydrocarbon ring or a hetero ring, each of each of $R^1$ and $R^2$ is an alkyl group, a halogen atom or a trifluoromethyl group, each of $R^2$, $R^{12}$ and $R^3$ is a hydrogen atom, an alkyl group, a halogen atom, a trifluoromethyl group or a substituted or unsubstituted phenyl group, and $R^4$ is a hydrogen atom or a substituted or unsubstituted alkyl, aryl or cycloalkyl group, wherein X and X' may be the same or different, and Y and Y' may be the same or different, (IV)

wherein each of rings A, A' and B is a hydrocarbon ring or a hetero ring, each of and each of $R^5$ and $R^{5'}$ is an alkyl group, a halogen atom or a trifluoromethyl group, wherein $R^6$ is a hydrogen atom or a substituted or unsubstituted alkyl, aryl or cycloalkyl group, A and A' may be the same or different, and Z and Z' may be the same or different.

4. The optical recording material according to claim 3, wherein in the formula III, each of Y and Y' is each of $R^1$ and $R^{11}$ is an alkyl group having from 1 to 4 carbon atoms, and each of $R^2$, $R^3$ and $R^{12}$ is an alkyl group having from 1 to 20 carbon atoms.

5. The optical recording material according to claim 3, wherein in the formula III, Y and Y' are the same and each represents and each of $R^1$, $R^2$, $R^3$, $R^{11}$ and $R^{12}$ is an alkyl group having from 1 to 4 carbon atoms.

6. The optical recording material according to claim 3, wherein in the formula III, each of Y and Y' is 7. The optical recording material according to claim 3, wherein in the formula III, each of Y and Y' is each of X and X' is and each of $R^1$, $R^2$, $R^{11}$ and $R^{12}$ is an alkyl group having from 1 to 4 carbon atoms or a phenyl group which is unsubstituted or substituted by a lower alkyl group, a lower alkoxy group or a halogen atom.

8. The optical recording material according to claim 3, wherein in the formula IV, each of Z and Z' is each of $R^5$ and $R^{5'}$ is an alkyl group having from 1 to 4 carbon atoms, each of rings A and A' is a benzene ring, a naphthalene ring, a pyridine ring or a quinoline ring.

9. the optical recording material according to claim 8, wherein in the formula IV, each of Z and Z' is each of $R^5$ and $R^{5'}$ is an alkyl group having 1 or 2 carbon atoms, and each of rings A and A' is a benzene ring.

10. The optical recording material according to claim 3, wherein in the formula III or IV, ring B is a benzene ring, a naphthalene ring, a quinoline ring or a ring of the formula:

wherein $X^3$ is wherein $R^{16}$ is a hydrogen atom or an alkyl group which is unsubstituted or substituted by an alkoxy group or a phenyl group, and Q is O, S or NH, or when $X^3$ is $X^3$ and Q may be connected to form a benzoimidazole ring.

11. The optical recording material according to claim 3, wherein in the formula III or IV, ring B is a ring of the formula:

12. The optical recording material according to claim 3, wherein the ethylene derivative is a dithienyl maleic anhydride derivative of the formula:

wherein each of $R^8$, $R^9$, $R^{14}$ and $R^{15}$ is an alkyl group having from 1 to 4 carbon atoms, and each of $R^7$ and $R^{13}$ is an alkyl group having 1 or 2 carbon atoms.

13. The optical recording material according to claim 3, wherein the ethylene derivative is a dithienyl maleic anhydride derivative of the formula:

wherein each of $R^8$ and $R^{14}$ is an alkyl group having from 1 to 4 carbon atoms or a phenyl group, and each of $R^7$ and $R^{13}$ is an alkyl group having 1 or 2 carbon atoms.

14. The optical recording material according to claim 1, wherein the recording layer is formed on a substrate by coating or vapor deposition.

15. The optical recording material according to claim 14, wherein the recording layer contains a binder.

16. The optical recording material according to claim 15, wherein the binder is selected from the group consisting of polyester resin, polystyrene resin, polyvinyl butyral resin, polyvinylidene chloride, polyvinyl chloride, polymethyl methacrylate, polyvinyl acetate, cellulose acetate, epoxy resin and phenol resin.

17. The optical recording material according to claim 15, wherein the ethylene derivative is in an amount of at least 1% by weight relative to the binder.

18. The optical recording material according to claim 14, wherein the recording layer formed on the substrate by coating has a thickness of from 100 Å to 100 μm.

19. The optical recording material according to claim 1, wherein the recording layer is formed as being sealed in a cell.

20. The optical recording material according to claim 19, wherein the concentration of the ethylene derivative in the recording layer sealed in the cell is at least $10^{-5}$ mol/liter.

* * * * *

UNITED STATES PATENT AND TRADEMARK OFFICE
CERTIFICATE OF CORRECTION

PATENT NO. : 4,837,063

DATED : JUNE 6, 1989

INVENTOR(S) : MASAHIRO IRIE

It is certified that error appears in the above-identified patent and that said Letters Patent is hereby corrected as shown below:

Column 25, Claim 1, last line of claim, change "of" to --or--.

Signed and Sealed this

Fifteenth Day of October, 1991

Attest:

*Attesting Officer*

HARRY F. MANBECK, JR.

*Commissioner of Patents and Trademarks*